United States Patent Office 2,768,874
Patented Oct. 30, 1956

2,768,874

METHOD OF MAKING HYDROXYLAMINE PERCHLORATE

John H. Robson III, China Lake, Calif.

No Drawing. Application July 1, 1952,
Serial No. 296,770

3 Claims. (Cl. 23—85)

(Granted under Title 35, U. S. Code (1952), sec. 266)

The invention described herein may be manufactured and used by or for the Government of the United States of America for governmental purposes without the payment of any royalties thereon or therefor.

This invention relates to a new compound, hydroxylamine perchlorate and the method for its preparation.

The new compound of the invention is a hygroscopic solid at room temperature. It was found to have great utility as an additive to propellant compositions to produce a fast burning rate. It was found that the inclusion of the compound of this invention in certain composite propellant compositions increased the burning rate from 100 to 200 percent. Such fast burning propellants would have great importance commercially and in ordnance.

It is an object of this invention to provide a new compound, hydroxylamine perchlorate.

The compound may be prepared by treating the hydrochloride or sulfate salt of hydroxylamine with barium perchlorate followed by filtration and recrystallization.

The invention is illustrated by the following example but is not limited thereto.

39.0 grams (0.45 mole) of hydroxylamine hydrochloride were dissolved in 800 cc. of absolute ethanol in a 2000 cc. Erlenmeyer flask equipped with a motor driven stirrer. To this was added slowly with stirring a solution of 75.0 grams (0.223 mole) of barium perchlorate in 250 cc. of absolute ethanol. When addition was completed, the precipitate formed was removed by filtration and the filtrate concentrated on a steam bath at reduced pressure to a white solid. This solid was triturated with 200 cc. of ether, a small amount of insoluble salt removed by filtration and the product crystallized from the ethereal solution by the slow addition of benzene. A final crystallization in the above manner gave 34.8 g. (55% yield) of white crystalline hydroxylamine perchlorate.

The new compound of the invention has the following formula:

$NH_2OH \cdot HClO_4$

The calculated equivalent weight of the new compound is 133.5. Analysis by base titration gave 135.1 and 135.3. The calculated percent of nitrogen in the compond is 10.47. Analysis with the Dumas combustion method gave 10.32 nitrogen.

The compound is highly hygroscopic at room temperature. It has a melting point between 87.5° C. and 89.0° C. and decomposes at 120° C. It was found to have an impact sensitivity of 15, as determined with the Bureau of Mines impact machine, this figure being the distance in centimeters a 2 kilogram weight was required to fall in order to produce 50% shots.

It is thus seen from the above that there has been provided a new compound having utility as an additive to propellants to increase their burning rate.

What is claimed is:

1. The process of preparing hydroxylamine perchlorate which consists in reacting hydroxylamine hydrochloride with barium perchlorate in a solution of absolute ethyl alcohol.

2. The process of claim 1 in which the molar ratio of hydroxylamine hydrochloride to barium perchlorate is about 2 to 1.

3. The process of preparing hydroxylamine perchlorate which consists in reacting hydroxylamine hydrochloride with barium perchlorate in a solution of absolute ethyl alcohol, removing the precipitate by filtration, concentrating the filtrate to form a solid, triturating the solid with an excess of ether, and crystallizing hydroxylamine perchlorate from the ether solution by slow addition of benzene.

References Cited in the file of this patent

Salvadori: Journal of the Society of Chemical Industry, vol. 26, page 1066 (1907).

Turrentine: Journal of the American Chemical Society, vol. 37, page 1108 (1915). (Copy in Scientific Library.)

Mellor: Comprehensive Treatise on Inorganic and Theoretical Chemistry, vol. 8, pages 300–304 (1928). Published by Longmans, Green & Co., London. (Copy in Scientific Library.)

Friend: Textbook of Inorganic Chemistry, vol. 6, part 1, pages 111–112 (1928). Published by Charles Griffin & Co., London. (Copy in Scientific Library.)

Chemical Abstracts, vol. 31, page 6466 (1937). (Copy in Scientific Library.)

Mellor: Comprehensive Treatise of Inorganic and Theoretical Chemistry, vol. II, pages 395 and 396 (1946). Published by Longmans, Green & Co., London. (Copy in Scientific Library.)